(12) United States Patent
Tsuchida et al.

(10) Patent No.: US 10,009,220 B2
(45) Date of Patent: Jun. 26, 2018

(54) IN-VEHICLE INFORMATION SYSTEM AND INFORMATION PROCESSING METHOD THEREOF

(71) Applicant: CLARION CO., LTD., Saitama-shi, Saitama (JP)

(72) Inventors: Gen Tsuchida, Tokyo (JP); Daisuke Matsubara, Tokyo (JP); Kyousuke Tsurusu, Saitama (JP); Yasushi Nagai, Saitama (JP); Haruhiko Sawajiri, Saitama (JP)

(73) Assignee: CLARION CO., LTD., Saitama (JP)

( * ) Notice: Subject to any disclaimer, the term of this patent is extended or adjusted under 35 U.S.C. 154(b) by 16 days.

(21) Appl. No.: 15/125,369

(22) PCT Filed: Apr. 17, 2015

(86) PCT No.: PCT/JP2015/061847
§ 371 (c)(1),
(2) Date: Sep. 12, 2016

(87) PCT Pub. No.: WO2015/182281
PCT Pub. Date: Dec. 3, 2015

(65) Prior Publication Data
US 2017/0099177 A1    Apr. 6, 2017

(30) Foreign Application Priority Data

May 27, 2014 (JP) .................................. 2014-109539

(51) Int. Cl.
*G05D 1/00* (2006.01)
*G06F 15/173* (2006.01)
(Continued)

(52) U.S. Cl.
CPC ...... *H04L 41/069* (2013.01); *G06F 17/30864* (2013.01); *H04L 41/0677* (2013.01);
(Continued)

(58) Field of Classification Search
CPC ..... H04L 41/069; H04L 43/045; H04L 67/42; H04L 67/12; H04L 41/0677;
(Continued)

(56) References Cited

U.S. PATENT DOCUMENTS 8,090,691 B2 *  1/2012  Lynn ................. G06F 17/30368
                                                     707/648
8,195,777 B2 *  6/2012  Hanai ..................... G06F 15/16
                                                     709/214
(Continued)

FOREIGN PATENT DOCUMENTS

| JP | 2003-228498 A | 8/2003 |
|----|---------------|--------|
| JP | 2013-011995 A | 1/2013 |
| JP | 2014-182715 A | 9/2014 |

*Primary Examiner* — Andrew Joseph Rudy
(74) *Attorney, Agent, or Firm* — Volpe and Koenig, P.C.

(57) ABSTRACT

An in-vehicle terminal and a mobile terminal receive a request and a first identifier for identifying the request and store the first identifier in a buffer, the mobile terminal sends the request to a server, which stores the first identifier in a buffer when the request includes the first identifier and generates a second identifier when the request does not include the first identifier. When an event occurs, the mobile terminal generates and stores a message and a message code related to the second identifier together with the second identifier, transfers a response including the first identifier, the message and the message code to the mobile terminal when the first identifier exists in the buffer, and transfers a response including the message and the message code to the mobile terminal when the first identifier does not exist in the buffer. The mobile terminal displays the message and the message code.

5 Claims, 11 Drawing Sheets

(51) Int. Cl.
*G06Q 30/00* (2012.01)
*H04L 12/24* (2006.01)
*G06F 17/30* (2006.01)
*H04L 12/26* (2006.01)
*H04L 29/06* (2006.01)
*H04L 29/08* (2006.01)

(52) U.S. Cl.
CPC ............ *H04L 43/045* (2013.01); *H04L 67/12* (2013.01); *H04L 67/42* (2013.01)

(58) Field of Classification Search
CPC .......... G06F 17/30864; G06Q 30/0601; G06Q 30/02; G06Q 30/0269; G06Q 10/87; G06Q 20/203; G06Q 10/08
USPC ......... 370/242; 235/454, 487, 494, 375–377, 235/383–385; 701/1, 22–25; 705/26.1, 705/26.61, 26.64, 28
See application file for complete search history.

(56) References Cited

U.S. PATENT DOCUMENTS

| | | | |
|---|---|---|---|
| 8,645,319 B2* | 2/2014 | Iwaki ................ | G06F 17/30368 707/610 |
| 8,958,927 B2* | 2/2015 | Tsuchida ............ | G06F 11/0739 701/1 |
| 9,069,655 B2* | 6/2015 | Suzuki .................... | G06F 12/02 |
| 9,864,772 B2* | 1/2018 | Cherkauer ........ | G06F 17/30368 |
| 9,891,979 B2* | 2/2018 | Liu ..................... | G06F 11/0775 |
| 2008/0121690 A1* | 5/2008 | Carani .................. | G01S 5/0027 235/376 |
| 2008/0122656 A1* | 5/2008 | Carani .................. | G07C 5/008 340/995.28 |
| 2008/0122691 A1* | 5/2008 | Carani .................. | H04W 4/02 342/357.48 |
| 2008/0125964 A1* | 5/2008 | Carani .................. | G06Q 10/08 701/408 |
| 2008/0125965 A1* | 5/2008 | Carani .................. | G07C 5/008 701/408 |
| 2014/0288728 A1 | 9/2014 | Tsuchida et al. | |

* cited by examiner

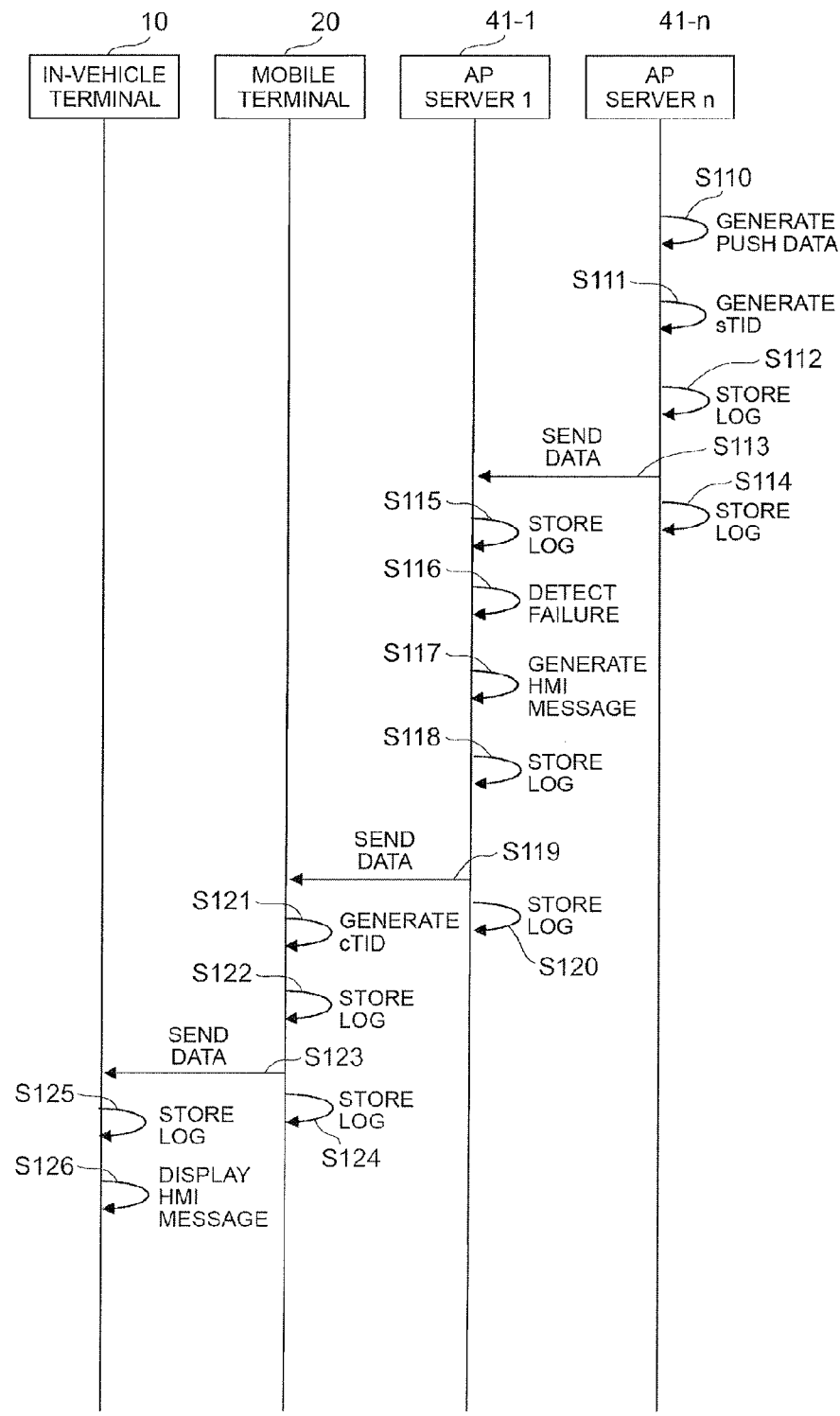

IN-VEHICLE INFORMATION SYSTEM AND INFORMATION PROCESSING METHOD THEREOF

TECHNICAL FIELD

The present invention relates to an in-vehicle information system in which a communication terminal and an in-vehicle terminal access a server in coordination, and to an information processing method thereof.

BACKGROUND ART

In recent years, known is a telematics system of using a communication line of a mobile communication terminal ("mobile terminal") such as a smartphone and connecting an in-vehicle terminal of a car navigation or the like and a data center, and providing various car navigation-related services through such communication line.

Moreover, if some kind of failure occurs in the in-vehicle terminal or the mobile terminal, the log data stored in the in-vehicle terminal or the mobile terminal is collected by the data center, and the data center analyzes the failure that occurred in the in-vehicle terminal or the mobile terminal.

For example, in PTL 1, a web server that received a request from a client generates a transaction ID (Identification) for identifying the series of processes, routes the generated transaction ID among a plurality of servers and outputs a log including the transaction ID, and the person in charge who received a complaint from the client terminal to the effect that the screen display is slow searches for a log corresponding to the condition of "all processing times are a given length of time or longer", narrows down the logs by using the transaction ID, and thereby determines which process took time.

CITATION LIST

Patent Literature

[PTL 1] Japanese Patent Application Publication No. 2013-11995

SUMMARY OF INVENTION

Technical Problem

Nevertheless, according to the method of PTL 1, for instance, if a failure occurs in the communication between the in-vehicle terminal and the mobile terminal, since a transaction ID has not been issued by the in-vehicle terminal and the mobile terminal, it is difficult to analyze which processing was subject to the failure. Moreover, in cases where the request from the in-vehicle terminal to the server did not reach the server, since the server is unable to issue a transaction ID for a request that it did not receive, it is difficult to analyze which processing was subject to the failure.

An object of the present invention is to provide an in-vehicle information system capable of outputting information for identifying a failure location by storing information that can be commonly managed by an in-vehicle terminal and a mobile terminal and a server at least as logs, and an information processing method thereof.

Solution to Problem

In order to achieve the foregoing object, the present invention is characterized in that an in-vehicle terminal configuring an in-vehicle information system generates, upon sending a request to a server, a first transaction identifier for identifying a series of transactions prescribed in the request and stores the generated first transaction identifier in an in-vehicle log buffer, sends the request including the first transaction identifier to a mobile terminal, the mobile terminal, stores, upon receiving the request, the first transaction identifier in a mobile log buffer and sends the request to the server, the server stores, upon receiving the request, the first transaction identifier in a server log buffer on a condition that the first transaction identifier exists in the received request, generates a second transaction identifier for identifying processing of the received request on a condition that the first transaction identifier does not exist in the received request, and generates, on a condition that an event has occurred, a first message for displaying contents of the event and a first message code related to the second transaction identifier, storing the second transaction identifier and the first message code in the server log buffer, and transferring, upon sending a response, a response including the first transaction identifier, the first message and the first message code to the mobile terminal on a condition that the first transaction identifier exists in the server log buffer, transfers a response including the first message and the first message code to the mobile terminal on a condition that the first transaction identifier does not exist in the server log buffer, the mobile terminal stores, upon receiving any one of the responses, information added to the received response in the mobile log buffer and transfers the received response to the in-vehicle terminal, and the in-vehicle terminal stores, upon receiving the response, the information added to the response in the in-vehicle log buffer and outputs the first message and the first message code.

Advantageous Effects of Invention

According to the present invention, it is possible to output information for identifying a failure location by storing information that can be commonly managed by an in-vehicle terminal and a mobile terminal and a server at least as logs.

BRIEF DESCRIPTION OF DRAWINGS

FIG. 15 is a sequence diagram explaining the processing of the third embodiment.

DESCRIPTION OF EMBODIMENTS

An embodiment of the present invention is now explained based on the drawings.

(Embodiment 1)

This embodiment describes a case of using, in a data center, a transaction ID generated by the in-vehicle terminal.

Figure 1:
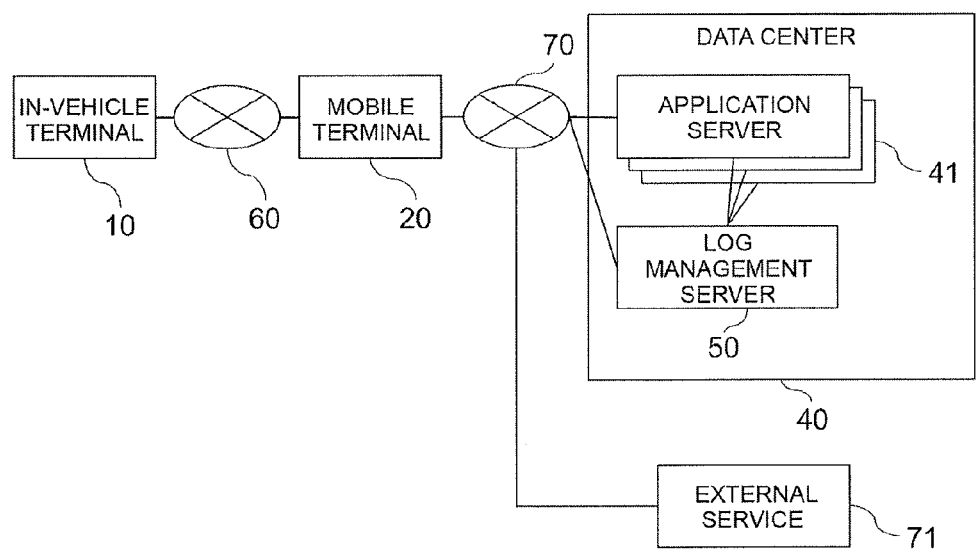
FIG. 1 is a configuration diagram showing the first embodiment of the in-vehicle information system according to the present invention.

FIG. 1 is a configuration diagram showing the first embodiment of the in-vehicle information system according to the present invention. In FIG. 1, the in-vehicle information system includes, as a telematics system, an in-vehicle terminal 10, a mobile terminal 20, and a data center 40, and the in-vehicle terminal 10 and the mobile terminal 20 are mutually connected via an inter-terminal network 60, and the mobile terminal 20 is connected to the data center 40 via an internet network 70, and also connected to an external service 71. The internet network 70 is configured from a carrier network (NW) line provided by a communication carrier of the mobile terminal 20, or from an ISP network provided by an internet service provider (ISP). Moreover, the data center 40 and the mobile terminal 20 are connected to the external service 71 via the internet network 70. The external service 71 provides a service, which is different from the service of the data center 40, to the mobile terminal 20 and the in-vehicle terminal 10 via the internet network 70.

The data center 40 is a computer device comprising information processing resources such as a CPU (Central Processing Unit), a memory, and an I/O interface, and is configured from an application (AP) server group 41 which provides a service to the user of the in-vehicle terminal 10 and the mobile terminal 20, and a log management server 50 which collects logs from the mobile terminal 20 and the application server group 41 and stores and manages the collected logs, and the respective application servers (hereinafter sometimes collectively referred to as the "AP servers") 41 and the log management server 50 are mutually connected. Note that, in substitute for consolidating and arranging the application server group 41 and the log management server 50 entirely within the data center 40, they may also be distributed and arranged in a plurality of data centers.

Figure 2:
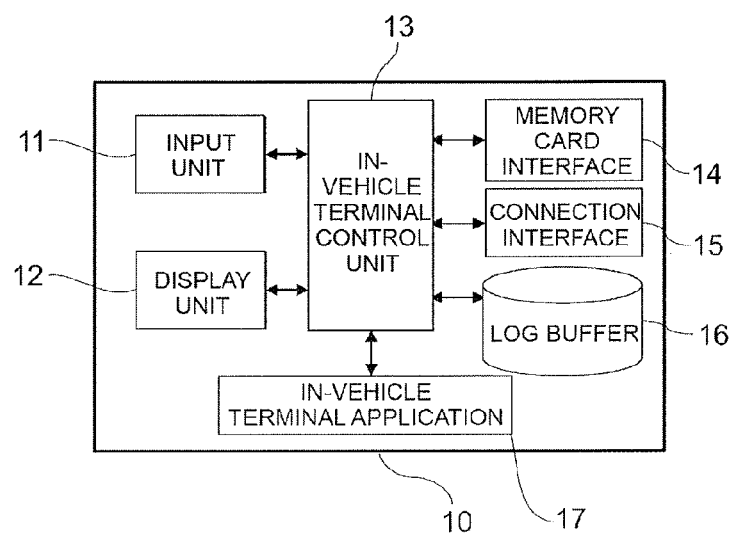
FIG. 2 is a configuration diagram of the in-vehicle terminal.

FIG. 2 is a configuration diagram of the in-vehicle terminal. In FIG. 2, the in-vehicle terminal 10 is configured from an input unit 11 which inputs information based on operations performed by the user, a display unit 12 which displays information to the user, an in-vehicle terminal control unit 13 which governs the control of the overall in-vehicle terminal 10, a memory card interface (IF) 14 which identifies the memory card, which is an external storage device, a connection interface (IF) 15 which communicates with the mobile terminal and other equipment, a log buffer (in-vehicle log buffer) 16 which stores logs that are output from the in-vehicle terminal control unit 13, and an in-vehicle terminal application 17 that runs on the in-vehicle terminal control unit 13. The connection interface 15 is connected to the mobile terminal 20 via the inter-terminal network 60. As the inter-terminal network 60, used may be, for example, a cable or IEEE802.15.1, IEEE802.11 series or the like.

The in-vehicle terminal application 17 is configured, for example, from a car navigation application program. The in-vehicle terminal control unit 13 can display information of the car navigation on the screen of the display unit 12 by executing the in-vehicle terminal application 17. Moreover, the in-vehicle terminal application 17 generates, upon sending a request to the data center 40, a cTID as the transaction ID (first transaction identifier) for uniquely identifying a series of transactions prescribed in the request, and transfers the request including the generated transaction ID (cTID) to the mobile terminal 20 via the connection interface 15 and the inter-terminal network 60. Here, after transferring the request including the transaction ID (cTID) to the mobile terminal 20, the in-vehicle terminal application 17 stores the transaction ID (cTID), together with time information, as a transmission log or a communication log in the log buffer 16. Note that, in the ensuing explanation, when logs such as transmission logs, communication logs or application logs are stored in a storage medium such as a log buffer 16, the explanation will be provided on the assumption that such logs include time information regarding the time that the logs were stored.

Moreover, when the in-vehicle terminal application 17 detects, for instance, a failure as an event, the in-vehicle terminal application 17 generates an HMI (Human Machine Interface) message for displaying the contents of the failure and an HMI message code, in which information of the contents of the failure is coded, and stores an application log including the generated HMI message and HMI message code in the log buffer 16.

Figure 3:
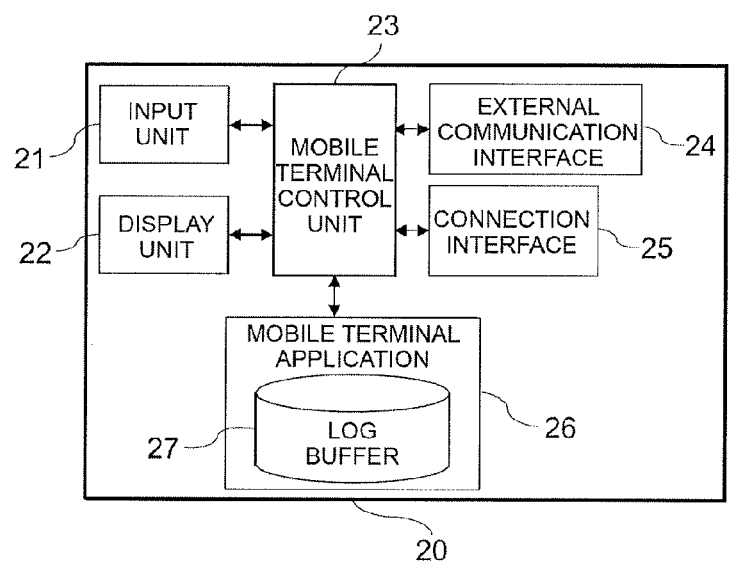
FIG. 3 is a configuration diagram of the mobile terminal.

FIG. 3 is a configuration diagram of the mobile terminal. In FIG. 3, the mobile terminal 20 is configured from an input unit 21 which inputs information based on operations performed by the user, a display unit 22 which displays information to the user, a mobile terminal control unit 23 which governs the control of the overall mobile terminal 20, an external communication interface (IF) 24 which communicates externally through the internet network 70, a connection interface (IF) 25 which connects with the in-vehicle terminal and other equipment, and a mobile terminal application 26 that runs on the mobile terminal control unit 23. The mobile terminal application 26 is equipped with a mobile terminal application log buffer 27.

The mobile terminal application 26 is configured from a mobile terminal application program. The mobile terminal control unit 23 executes the mobile terminal application 26 and displays information on the screen of the display unit 22 according to the mobile terminal application 26. Moreover, in order to send a request to the data center 40, the mobile terminal application 26 coordinates with the in-vehicle terminal 10 and stores, upon receiving a request transferred from the in-vehicle terminal 10 via the connection interface 25, a request reception log including a transaction ID (cTID) as a communication log in the log buffer 26, and thereafter sends a request including the received transaction ID (cTID) to the data center 40 via the external communication interface 25 and the internet network 70. Here, the mobile terminal application 26 stores the request transmission log including the transaction ID (cTID) as a communication log in the log buffer 27.

Moreover, when the mobile terminal application 26 detects, for instance, a failure as an event, the mobile terminal application 26 generates an HMI message for displaying the contents of the failure and an HMI message code, in which information of the contents of the failure is coded, and stores an application log including the generated HMI message and HMI message code in the log buffer 27.

Here, with an in-vehicle information system in which the in-vehicle terminal 10 and the mobile terminal 20 are communicably connected, adopted is a screen transfer of executing the mobile terminal application 26, which is installed in the mobile terminal 20 and provided by the service provider of the data center 50, with the mobile terminal 20, transferring the execution screen of the mobile terminal application 26 executed with the mobile terminal 20 to the in-vehicle terminal 10 via the connection interface 25, and displaying the execution screen on the display unit 12 upon controlling the screen size and other aspects of the execution screen with the in-vehicle terminal control unit 13 of the in-vehicle terminal 10, or a screen transfer of executing the in-vehicle terminal application 17, which is installed in the in-vehicle terminal 10, with the in-vehicle terminal control unit 13, and the in-vehicle terminal application 17 coordinating with the mobile terminal 20 via the connection interface 15 and using the service of the data center 50 to display the execution screen on the display unit 12. In the ensuing explanation, examples adopting the latter screen transfer are explained, but the present invention can also be applied in cases of adopting the former screen transfer.

Figure 4:
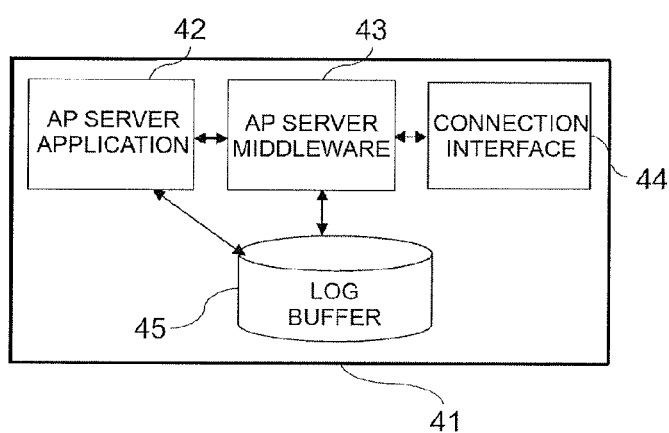
FIG. 4 is a configuration diagram of the AP server.

FIG. 4 is a configuration diagram of the AP server. In FIG. 4, the AP server 41 is configured from an AP server application 42 that runs on the AP server, middleware 43 which controls the operation of the AP server 41, a communication interface 44 which is connected to other AP servers and the internet network 70, and a log buffer 45 which stores various logs that are output by the AP server application 42 and the middleware 43.

The AP server application 42 is an application program that runs on the CPU which governs the control of the overall AP server 41, sends and receives information to and from the other AP servers 41 and the mobile terminal 20 via the connection interface 44, and stores, upon receiving a request from the mobile terminal 20, the request reception log in the log buffer 45. Here, when the AP server 41 to which the AP server application 42 belongs is the AP server 41 to return a response to the mobile terminal 20, the AP server application 42 that received the request executes processing according to the received request, sends the processing result as the response to the mobile terminal 20 via the connection interface 44, and stores the processing result as an application log in the log buffer (server log buffer) 45.

Moreover, when the AP server application 42 detects, for instance, a failure as an event in the course of executing the processing according to the request, the AP server application 42 generates an HMI message for displaying the contents of the failure and an HMI message code, in which information of the contents of the failure is coded, stores an application log including the generated HMI message and HMI message code in the log buffer 27, sends a transaction ID (cTID) added to the request and a response message storing the generated HMI message and HMI message code to the mobile terminal 20 via the connection interface 44, and stores a response transmission log including the transaction ID (cTID), the HMI message and the HMI message code in the log buffer 27.

Note that, when a transaction ID (cTID) has not been added to the received request, the AP server application 42 that received the request generates a transaction ID (sTID) as an identifier for identifying a series of transactions prescribed in the received request, and manages the generated transaction ID (sTID) as the second transaction identifier. The transaction ID (sTID) is configured from information having a greater data volume than the transaction ID (cTID) generated by the in-vehicle terminal 10, is managed according to an algorithm prescribed in the respective AP servers 41, and is managed as information that is common among the respective AP servers 41.

Meanwhile, when the AP server 41 to which the AP server application 42 belongs is not the AP server 41 to return a response to the mobile terminal 20, the AP server application 42 that received the request stores the request reception log in the log buffer 45, and thereafter transfers the received request to another AP server (AP server to process the request) 41.

Figure 5:
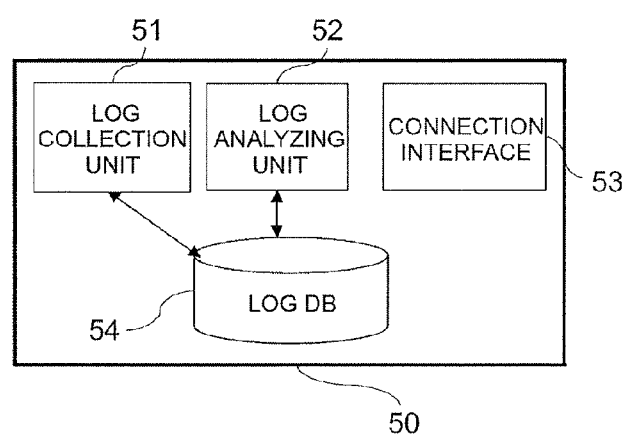
FIG. 5 is a configuration diagram of the log management server.

FIG. 5 is a configuration diagram of the log management server. In FIG. 5, the log management server 50 is configured from a log collection unit 51 which collects the logs output by the in-vehicle terminal 10, the mobile terminal 20 and the AP server 41, a log database (DB) 54 which stores the logs collected from the in-vehicle terminal 10, the mobile terminal 20 and the AP server 41, a log analyzing unit 52 which analyzes the logs stored in the log DB 54, and a connection interface 53 which is connected to the in-vehicle terminal 10, the mobile terminal 20 and the AP server 41 and additionally connected to a display device (not shown) including a PC for displaying the log analytical result.

The log collection unit 51 is a program that runs on the CPU which governs the control of the overall log collection unit 51, and has a function of collecting logs from the mobile terminal 20 and the AP server 41. The log analyzing unit 52 is a program that runs on the CPU which governs the control of the overall log collection unit 51, and has a function of analyzing the logs stored in the log DB 54 and transferring the analytical result to the mobile terminal 20 and the display device via the connection interface 53. The log database 54 exists in the log management server 50, but the log database 54 may also be disposed in a server that is different from the log management server 50.

Figure 6:
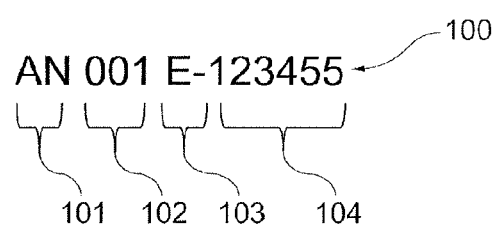
FIG. 6 is a configuration diagram of the HMI message code.

FIG. 6 is a configuration diagram of the HMI message code. In FIG. 6, the HMI message code 100 is configured from an identifier 101 which identifies the server or the application that detected the error, an error number 102 which shows the contents of the failure, an error level 103 which is indicated with I (Information), W (Warning), E (Error) or the like, and a lower number 104 which shows the last several digits of the transaction ID.

As the identifier 101, two-digit information is used. As the error number 102, a three-digit number is used, and the contents of the failure are classified in accordance with this number. As the error level, one-digit information is used. As the lower number 104, six-digit information among the last several digits of the transaction ID is used.

Here, when the lower number 104 of the transaction ID is configured from information of the last six digits of the transaction ID (sTID), the lower number 104 is associated with the transaction ID (sTID). In other words, it is possible to identify the transaction ID (sTID) generated by the AP server 41 by referring to the lower number 104 within the HMI message code 100. The setting of the number of digits of information to be used in the HMI message code 100 may be changed arbitrarily. Moreover, information other than the identifier 101 to the lower number 104 may also be added to the HMI message code 100, and, moreover, information of only a part of the identifier 101 to the lower number 104 may also be added to the HMI message code 100.

Figure 7:
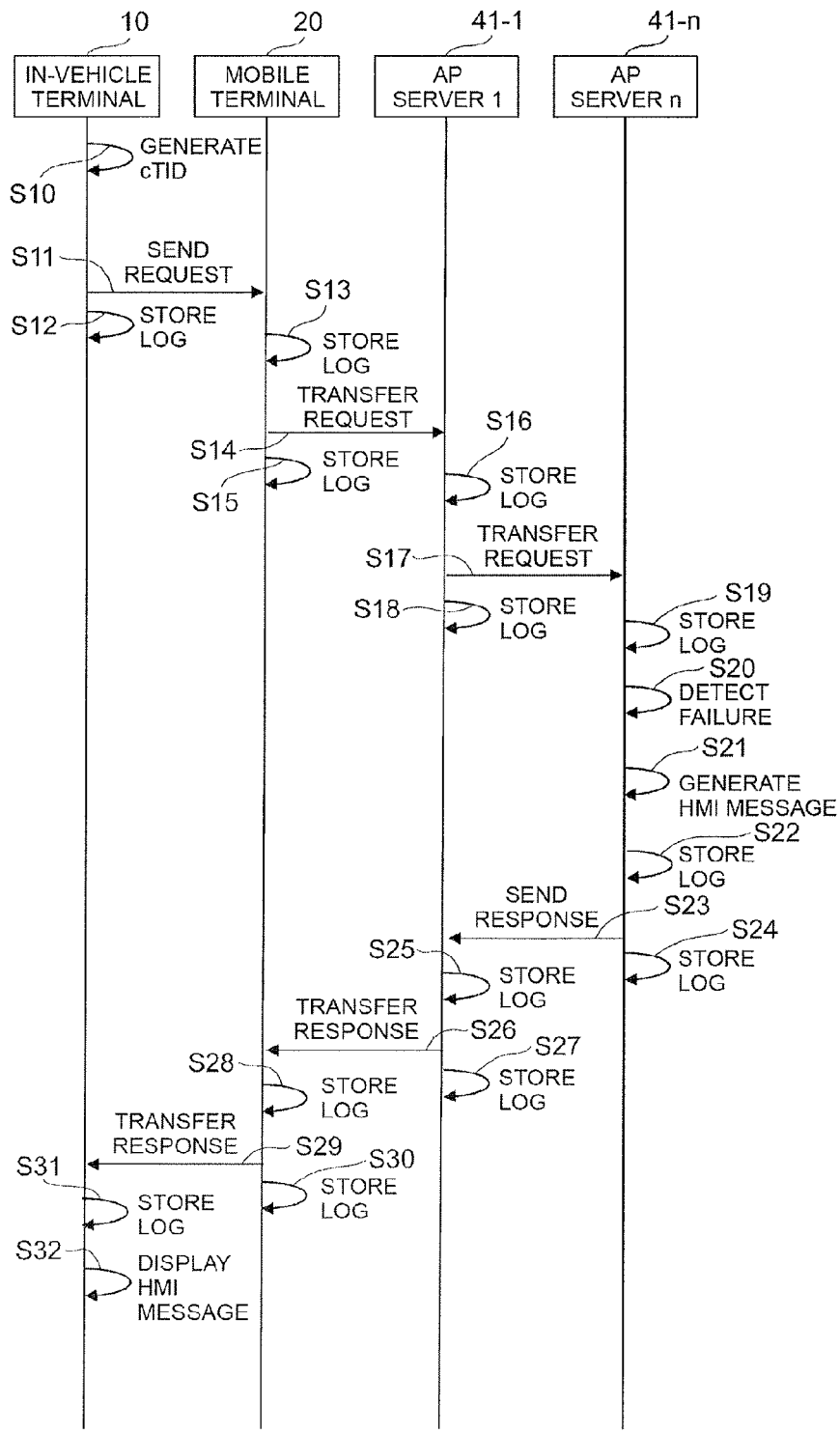
FIG. 7 is a sequence diagram explaining the processing of the first embodiment.

FIG. 7 is a sequence diagram explaining the processing of the first embodiment. This processing is an example of a case where the in-vehicle terminal application 16 of the in-vehicle terminal 10 sends a request to the AP server 41 in the data center 40 via the mobile terminal application 26 of the mobile terminal 20, and the AP server 41 detects a failure as an event.

In FIG. 7, the processing is started when the user of the in-vehicle terminal 10 executes the in-vehicle terminal application 17 via the input unit 11 of the in-vehicle terminal 10. The executed in-vehicle terminal application 17 generates a cTID as the transaction identifier for identifying the series of transactions prescribed in the request prior to sending a request to the data center 40 (S10), sends a request including the generated cTID as a request message to the mobile terminal 20 (S11), and stores a request transmission log (in-vehicle log) including the cTID as a communication log in the log buffer 16 (S12).

Upon receiving a request from the in-vehicle terminal 10, the mobile terminal application 26 of the mobile terminal 20 stores a request reception log (mobile log) including the cTID as a communication log in the log buffer 27 (S13), thereafter transfers a request including the cTID as a request message to the data center 40 (S14), and stores a request transmission log including the cTID as a communication log in the log buffer 27 (S15).

With the AP server 41 that received the request sent from the mobile terminal 20, for example, the AP server application 42 of an AP server 41-1 that exists at the front most part in the data center 40 stores a request reception log (server log) including the cTID as a communication log in the log buffer 45 (S16), and, when the AP server 41-1 itself is the AP server to send a response, thereafter executes processing according to the received request, and sends the processing result as a response to the mobile terminal 20.

Meanwhile, when the AP server 41-1 itself is not the AP server to send a response, the AP server application 42 of the AP server 41-1, in substitute for sending a response, transfers a request including the cTID as a request message to another AP server (AP server to process the request) 41 in the data center 40 (S17), and stores a request transfer log including the cTID as a communication log in the log buffer 45 (S18).

The AP server application 42 of an AP server 41-n that received the request transferred from the AP server 41-1 stores a request reception log including the cTID as a communication log in the log buffer 45 (S19). Subsequently, the AP server application 42 of the AP server 41-n executes processing according to the received request, and generates, for instance, upon detecting a failure as an event in the course of executing the processing (S20), an HMI message and an HMI message code (S21), stores an application log including the generated HMI message and HMI message code, and the cTID added to the request, in the log buffer 45 (S22), sends a response including the generated HMI message and HMI message code, and the cTID added to the request, as a response message to the AP server 41-1 (S23), and stores a communication log including the HMI message code and the cTID as a response transmission, to the effect that the response has been sent, in the log buffer 45 (S24).

Upon receiving the response message sent from the AP server 41-n, the AP server application 42 of the AP server 41-1 stores a response reception log including the HMI message, the HMI message code and the cTID as a communication log in the log buffer 45 (S25), transfers a response message including the HMI message, the HMI message code and the cTID to the mobile terminal 20 (S26), and stores a response transmission log including the HMI message code and the cTID as a communication log in the log buffer 45 (S27).

Upon receiving a response message as the response from the AP server 41-1, the mobile terminal application 26 of the mobile terminal 20 stores a response reception log including the HMI message, the HMI message code and the cTID as a communication log in the log buffer 27 (S28), transfers a response message including the HMI message, the HMI message code and the cTID to the in-vehicle terminal 10 (S29), and thereafter stores a response transmission log including the HMI message code and the cTID as a communication log in the log buffer 27 (S30).

Upon receiving a response message from the mobile terminal 20, the in-vehicle terminal application 17 of the in-vehicle terminal 10 stores a response reception log including the HMI message code and the cTID as a communication log in the log buffer 16 (S31), thereafter displays the HMI message and the HMI message code, which were added to the response message, on the screen of the display unit 12 (S32), and then ends the processing of this routine.

Figure 8:
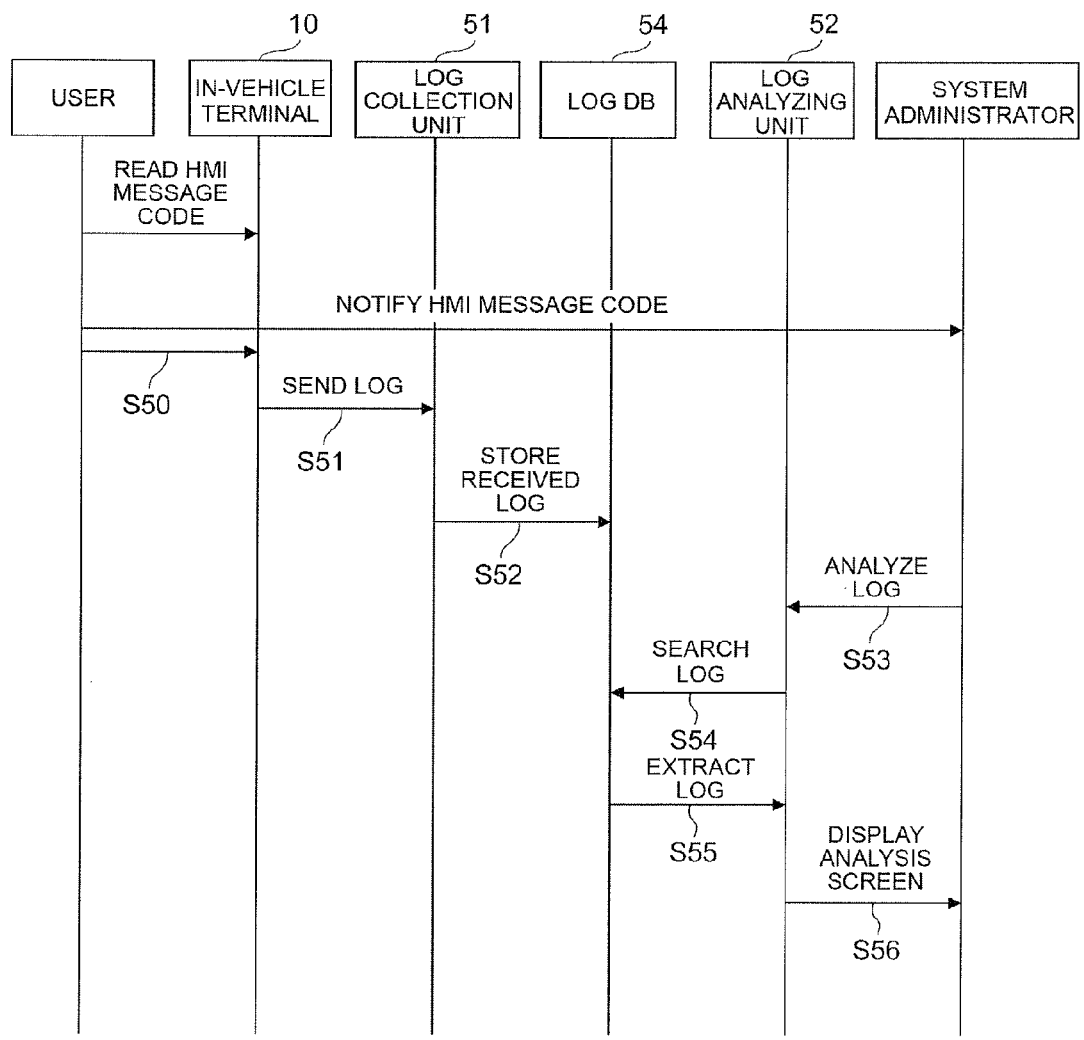
FIG. 8 is a sequence diagram explaining the log analysis processing.

FIG. 8 is a sequence diagram explaining the log analysis processing. This processing is started when the user of the in-vehicle terminal 10 reads the HMI message code 100 displayed on the screen of the display unit 12 of the in-vehicle terminal 10, and thereafter operates the in-vehicle terminal 10 and notifies the HMI message code 100 for identifying the log to be processed to the system administrator of the data center 40.

When the input unit 11 of the in-vehicle terminal 10 inputs information based on operations of the user (S50), the in-vehicle terminal application 17 of the in-vehicle terminal 10 extracts the logs (application logs and communication logs) storing the HMI message code 100 among the logs that are stored in the log buffer 16 based on the information input to the input unit 11, and sends the extracted logs to the log management server 50 of the data center 40 via the mobile terminal 20 (S51). Here, the mobile terminal application 26 of the mobile terminal 20 coordinates with the in-vehicle terminal 10 and sends the logs (application logs and communication logs) storing the HMI message code 100 among the logs stored in the log buffer 27 to the log management server 50 of the data center 40 via the internet network 70.

As the method of sending the logs stored in the log buffer 16 and the log buffer 27 to the log management server 50 of the data center 40, adopted may be a method of sending the logs from the mobile terminal 20 to the log management server 50 via the internet network 70, or a method of recording the logs in a memory card or the like connected to the memory card interface 14 of the in-vehicle terminal 10, and thereafter sending the logs recorded in the memory card to the log management server 50 of the data center 40 via a PC.

When the logs are sent from the in-vehicle terminal 10 to the log management server 50 of the data center 40, the log collection unit 51 of the log management server 50 receives the logs sent from the in-vehicle terminal 10 (S51), and stores the received logs in the log database (DB) 54 (S52).

Meanwhile, when the log analyzing unit 52 of the log management server 50 receives information such as the HMI message code 100 based on the log analysis operation performed by the system administrator (S53), the log analyzing unit 52 searches the log database 54 based on the information received through the operation performed by the system administrator (S54), extracts the communication logs and the application logs as the logs storing the HMI message code 100 among the logs stored in the log database 54 (S55), creates a sequence in which the order relation (chronological relation) is arranged in accordance with the time information of the respective logs based on the extracted logs (communication logs and application logs), displays the image of the created sequence on the log analysis screen managed by the system administrator (S56), and then ends the processing of this routine.

Note that the log database 54 stores the logs that are automatically collected from the AP server 41, and the logs that are collected from the AP server 41 during log analysis. Moreover, the log analyzing unit 52 of the log management server 50 may also transfer the image of the created sequence to the in-vehicle terminal 10, and display an image of a sequence showing the order relation (chronological order relation) of the communication logs and the application logs on the log analysis screen of the display unit 12.

Figure 9:
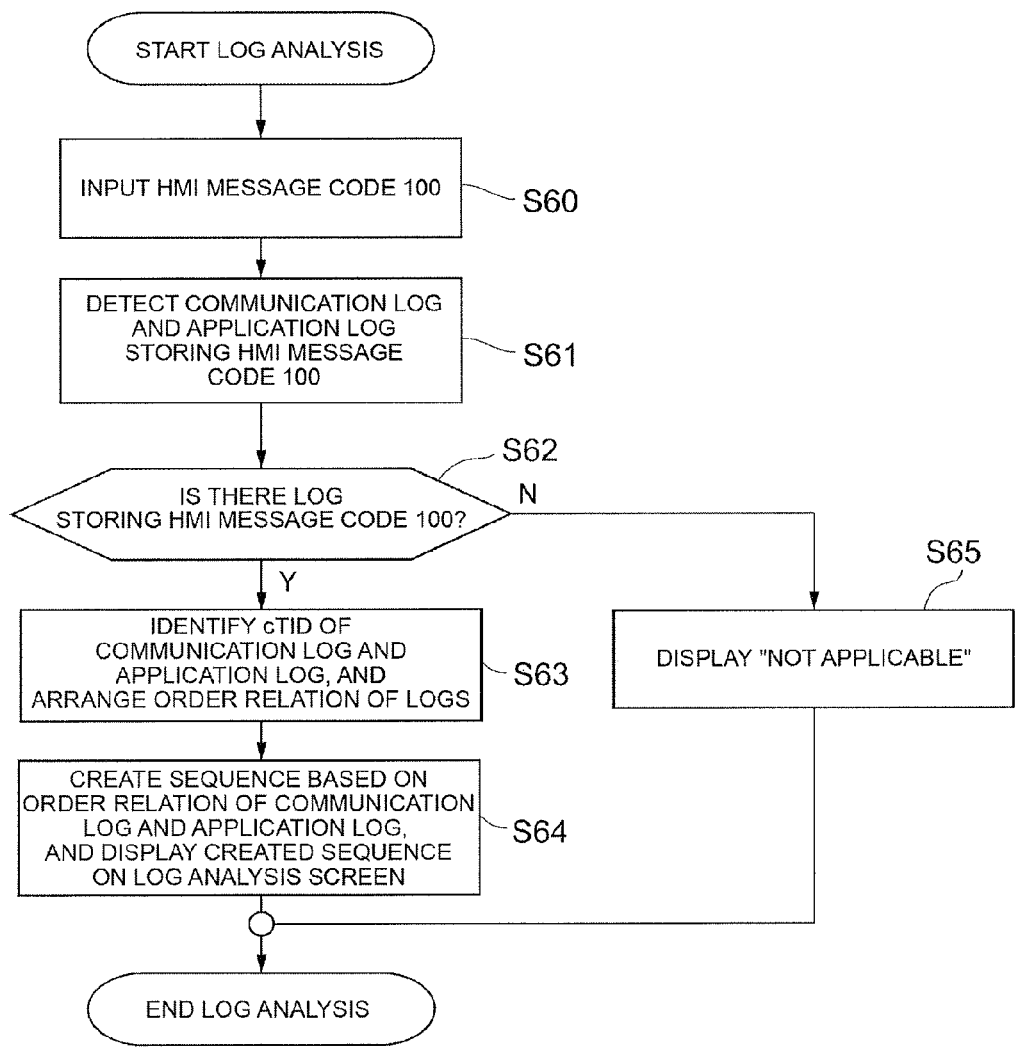
FIG. 9 is a flowchart explaining the log analysis processing.

FIG. 9 is a flowchart explaining the log analysis processing. This processing shows the specific contents of step S53 to step S56 of FIG. 8.

When the system administrator inputs the HMI message code communicated from the user into the log management server 50 as the information for identifying the logs to be analyzed (S60), the log analyzing unit 52 of the log management server 50 searches the log database 54 based on the HMI message code 100, which is information that was input through the operation of the system administrator, detects the communication logs and the application logs as the logs storing the HMI message code 100 among the logs stored in the log database 54 (S61), and determines whether the communication logs and the application logs exist in the logs stored in the log database 54 as the logs storing the HMI message code 100 (S62).

When the log analyzing unit 52 obtains a positive determination result in step S63; that is, when the logs storing the HMI message code 100 exist in the logs stored in the log database 54, the log analyzing unit 52 identifies the communication logs and the application logs as the logs storing the HMI message code 100 and also storing a cTID as the transaction ID, arranges the order relation (chronological relation) of the identified communication logs and application logs according to the time information of the respective logs (S63), creates a sequence including the communication logs and the application logs in which the order relation was arranged, displays an image of the created sequence on the log analysis screen managed by the system administrator (S64), and then ends the processing of this routine. Here, the system administrator can identify the failure location or the contents of the failure by operating the image of the sequence displayed on the log analysis screen.

Meanwhile, when a negative determination result is obtained in step S62; that is, when the logs storing the HMI message code 100 do not exist in the logs stored in the log database 54, the log analyzing unit 52 displays NA (Not Applicable) information (information to the effect that the logs to be analyzed do not exist) on the log analysis screen (S65), and then ends the processing of this routine.

Note that, in cases where the HMI message code 100 or the cTID overlaps and there is a possibility that it may not be uniquely associated, the transaction that was subject to a failure can be uniquely identified by using the in-vehicle terminal ID, or information such as the time that the failure occurred.

Figure 10:
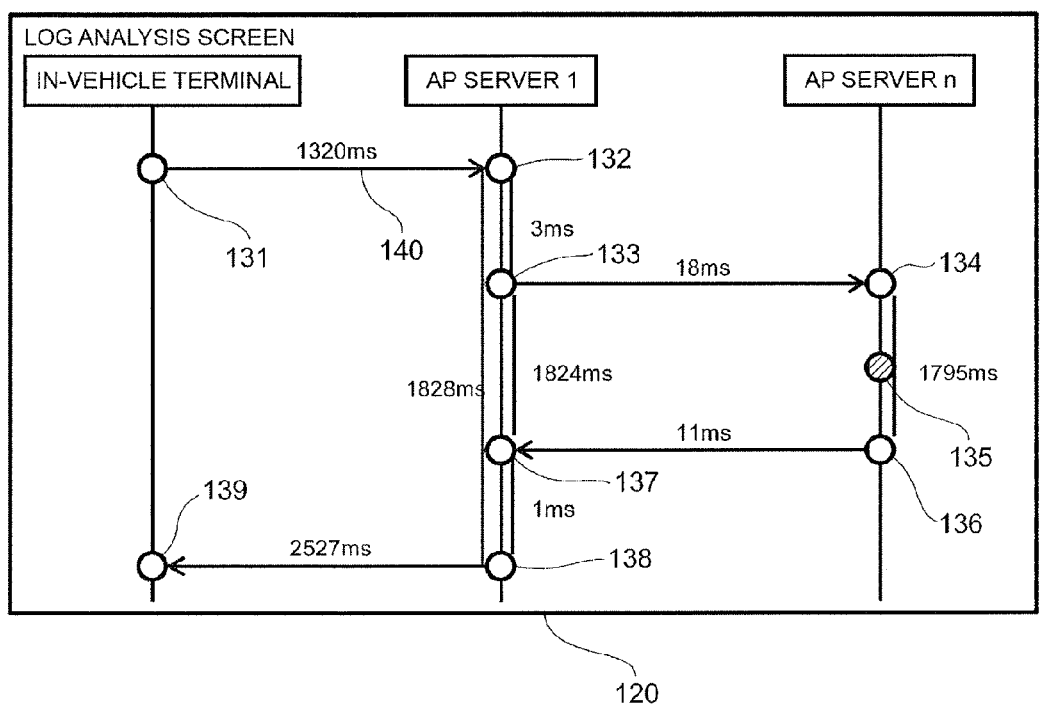
FIG. 10 is a configuration diagram showing a display example of the log analysis screen.

FIG. 10 is a configuration diagram showing a display example of the log analysis screen. In FIG. 10, an image of the sequence created by the log analyzing unit 52 is displayed on the log analysis screen 120 of the PC (Personal Computer) that is managed by the display unit 12 or the system administrator. For example, as the communication logs and the application logs stored in the log database 54 and which store the HMI message code 100 and the cTID of the transaction ID, the communication logs 131 to 134, the application log 135 and the communication logs 136 to 139 are displayed on the log analysis screen 120, in chronological order according to the stored time information, as the image of the sequence.

Here, by clicking the communication log 131, details of the communication log 131 can be perused. With regard to the communication processing time between the respective communication logs, for instance, by perusing the communication processing time 140 between the communication log 131 and the communication log 132, it is possible to know which processing took time among the series of transactions. Moreover, by clicking the application log 135, details of the application log output by the AP server 41 can be perused.

According to this embodiment, it is possible to output (display) information for identifying a failure location by storing information, such as the HMI message code 100, which can be commonly managed by the in-vehicle terminal 10, the mobile terminal 20 and the respective AP servers 41, at least as logs. Thus, the system administrator can identify the failure location and the contents of the failure from the communication logs 131 to 134, the application log 135 and the communication logs 136 to 139, the communication processing time between the respective communication logs, and information such as the HMI message code 100. For example, it is possible to identify the communication failure between the in-vehicle terminal 10 and the mobile terminal 20. Moreover, since the AP server 41 can execute processing by using the cTID added to the request without having to generate an sTID having a large data volume, it is possible to simplify the processing compared to the case where the processing of generating the sTID is required.

(Embodiment 2)

This embodiment describes a case where the transaction ID generated by the in-vehicle terminal 10 is not sent to the data center 40. Assuming that the in-vehicle terminals 10 of a plurality of vendors are connected to the data center 40, this case gives consideration to a situation where the data center 40 is unable to deal with the transaction ID sent from the respective in-vehicle terminals 10, and the data center 40 uses its independent transaction ID.

Moreover, this embodiment describes a case where the mobile terminal 20 sends, upon sending a request to the data center 40, only the request to the data center 40 without adding a transaction ID (cTID) generated by the in-vehicle terminal 10 to the request, and, upon receiving the foregoing request, the AP server 41 of the data center 40 generates an sTID (second transaction identifier) as the transaction ID for identifying the series of transactions prescribed in the received request, and uses the generated sTID to manage the processing of the received request in the respective AP servers 41, and the remaining configuration is the same as the first embodiment.

Figure 11:
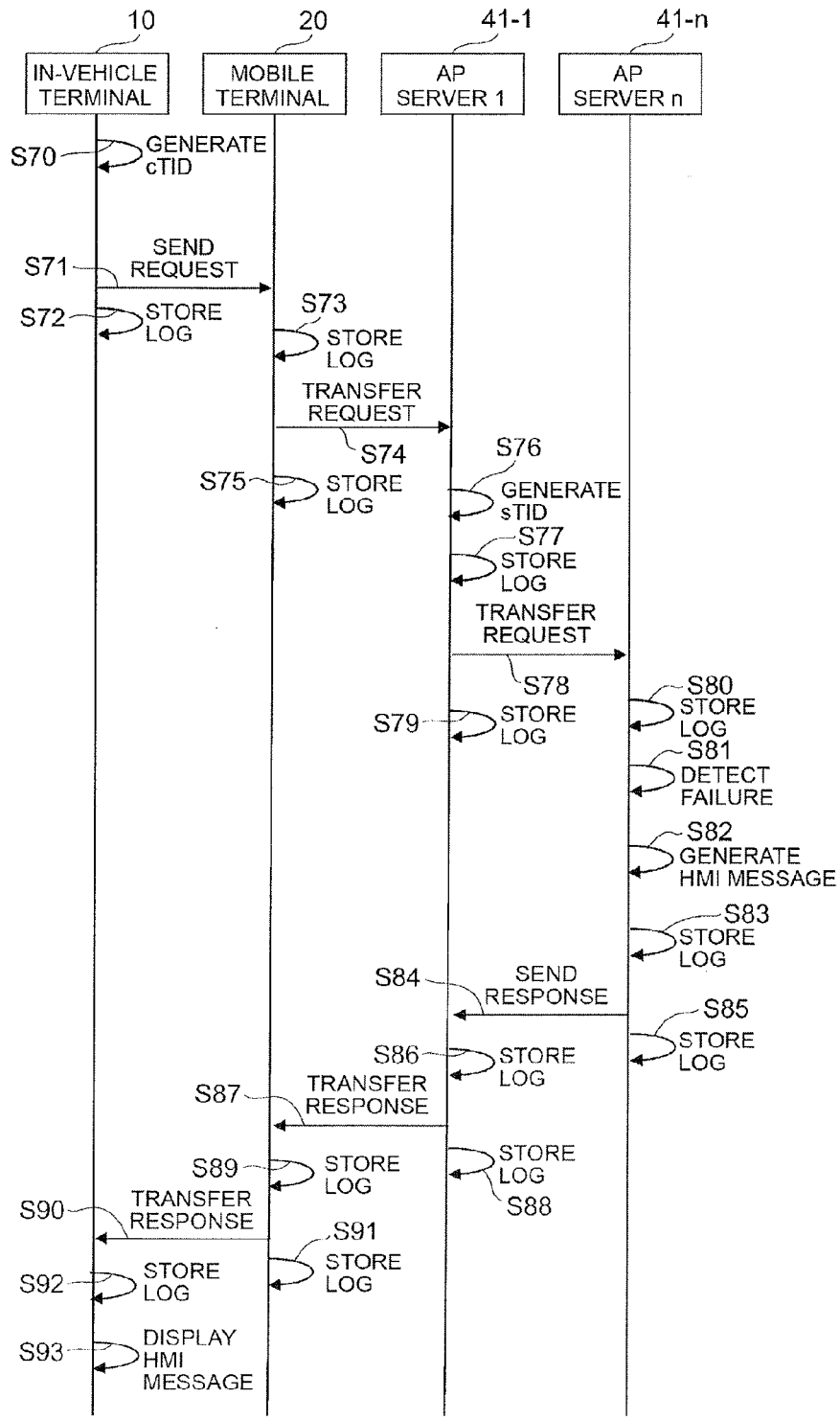
FIG. 11 is a sequence diagram explaining the processing of the second embodiment.

FIG. 11 is a sequence diagram explaining the processing of the second embodiment. This processing shows an example that is performed when the in-vehicle terminal application 16 of the in-vehicle terminal 10 sends a request to the AP server 41 in the data center 40 via the mobile terminal application 26 of the mobile terminal 20, and the AP server 41 detects a failure as an event.

In FIG. 11, the processing is started when the user of the in-vehicle terminal 10 executes the in-vehicle terminal application 17 via the input unit 11 of the in-vehicle terminal 10. Here, the processing of step S70 to step S73 is the same as the processing of step S10 to step S13 of the first embodiment.

Upon receiving the request from the in-vehicle terminal 10, the mobile terminal application 26 of the mobile terminal 20 stores a request reception log including the cTID as a communication log in the log buffer 27, thereafter transfers only a request message of the request to the data center 40 (S74), and stores a request transmission log, which includes the cTID and is a log to the effect that only the request was sent, as a communication log in the log buffer 27 (S75).

With the AP server 41 that received the request sent from the mobile terminal 20, for example, the AP server application 42 of an AP server 41-1 that exists at the front most part in the data center 40 generates an sTID (second transaction identifier) as the transaction ID for uniquely identifying the series of transactions prescribed in the received request on the condition of receiving only the request (S76), stores a request reception log, which includes the sTID and as a log to the effect that only the request was received, as a communication log in the log buffer 45 (S77), and, when the AP server 41-1 itself is the AP server to send a response, the AP server application 42 of the AP server 41-1 thereafter executes processing according to the received request, stores the processing result as an application log in the log buffer 45, and sends the processing result as a response to the mobile terminal 20.

Meanwhile, when the AP server 41-1 itself is not the AP server to send a response, the AP server application 42 of the AP server 41-1, in substitute for sending a response, transfers a request including the sTID as a request message to another AP server (AP server 41-n to process the request) 41 in the data center 40 (S78), and stores a request transfer log including the sTID as a communication log in the log buffer 45 (S79).

The AP server application 42 of an AP server 41-n that received the request transferred from the AP server 41-1 stores a request reception log including the sTID as a communication log in the log buffer 45 (S80). Subsequently, the AP server application 42 of the AP server 41-n executes processing according to the received request, and generates, for instance, upon detecting a failure as an event in the course of executing the processing (S81), an HMI message and an HMI message code (S82), stores an application log including the generated HMI message and HMI message code, and the sTID added to the request, in the log buffer 45 (S83), sends a response including the generated HMI message and HMI message code, and the sTID added to the request, as a response message to the AP server 41-1 (S84), and stores a communication log including the HMI message code and the sTID as a response transmission, to the effect that the response has been sent, in the log buffer 45 (S85).

Upon receiving the response message sent from the AP server 41-n, the AP server application 42 of the AP server 41-1 stores a response reception log including the HMI message code and the sTID as a communication log in the log buffer 45 (S86), transfers a response message including the HMI message and the HMI message code to the mobile terminal 20 (S87), and stores, as a log to the effect that a response has been sent, a response transmission log including the HMI message code and the sTID as a communication log in the log buffer 45 (S88).

Upon receiving a response message including the HMI message and he HMI message code as the response from the AP server 41-1, the mobile terminal application 26 of the mobile terminal 20 stores a response reception log including the HMI message code and the cTID stored in step S75 as a communication log in the log buffer 27 (S89), transfers a response message including the HMI message and the HMI message code to the in-vehicle terminal 10 (S90), and thereafter stores, as a log to the effect that the response message has been sent to the in-vehicle terminal 10, a response transmission log including the HMI message code and the cTID as a communication log in the log buffer 27 (S91).

Upon receiving a response message including the HMI message and the HMI message code from the mobile terminal 20, the in-vehicle terminal application 17 of the in-vehicle terminal 10 stores a response reception log including the HMI message code and the cTID stored in step S72 as a communication log in the log buffer 16 (S92), thereafter displays the HMI message and the HMI message code, which were added to the response message, on the screen of the display unit 12 (S93), and then ends the processing of this routine.

In this embodiment, the processing of isolating the failure in cases where the system administrator to isolate the failure receives an inquiry from the user of the in-vehicle terminal 10 is the same as the sequence (steps S50 to S56) of FIG. 8.

Figure 12:
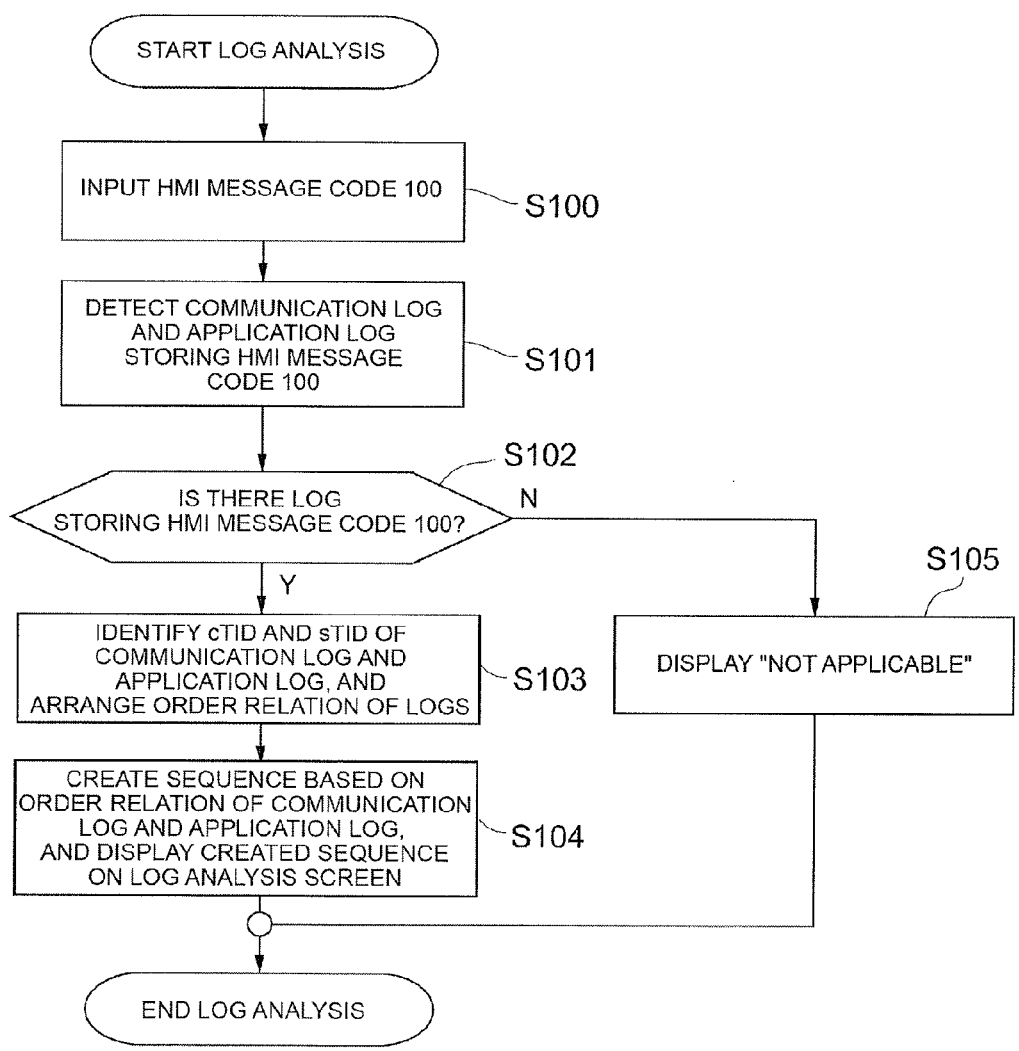
FIG. 12 is a flowchart explaining the log analysis processing.

FIG. 12 is a flowchart explaining the log analysis processing. This processing shows the specific contents of step S53 to step S56 of FIG. 8, and, other than the processing of step S103 among step S100 to step S105 differing from the processing of step S63 of FIG. 9, the remainder of the processing is the same as the processing of the steps of FIG. 9.

When the log analyzing unit 52 obtains a positive determination result in step S102; that is, when the logs storing the HMI message code 100 exist in the logs stored in the log database 54, the log analyzing unit 52 identifies the communication logs and the application logs as the logs storing the HMI message code 100 and also storing at least either a cTID or an sTID as the transaction ID, and arranges the order relation (chronological relation) of the identified communication logs and application logs according to the time information (S103). Subsequently, the log analyzing unit 52 creates a sequence including the arrangement of the communication logs and the application logs in which the order relation was arranged, displays a log analysis screen including an image of the created sequence on the display unit managed by the system administrator (S104).

Consequently, the system administrator can identify the failure location or the contents of the failure by operating the image of the sequence displayed on the log analysis screen.

Figure 13:
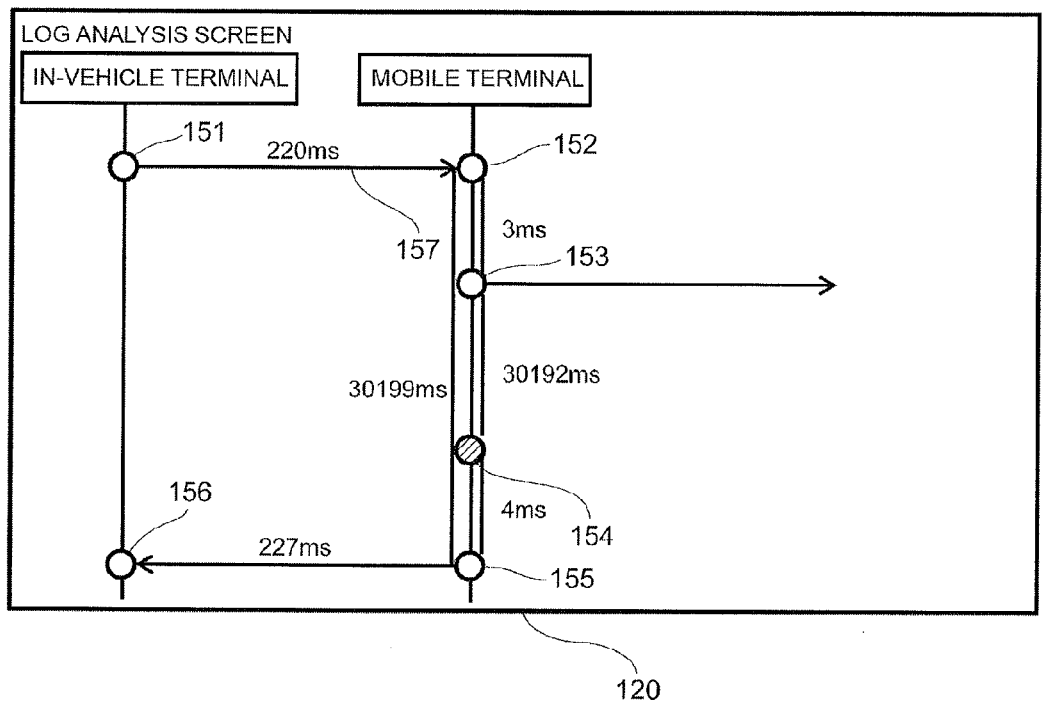
FIG. 13 is a configuration diagram showing a display example of the log analysis screen in the second embodiment.

FIG. 13 is a configuration diagram showing a display example of the log analysis screen in the second embodiment. In FIG. 13, an image of the sequence created by the log analyzing unit 52 is displayed on the log analysis screen 120 of the PC that is managed by the display unit 12 or the system administrator. For example, as the communication logs and the application logs stored in the log database 54 and which store the HMI message code 100 and at least either the cTID or the sTID of the transaction ID, the communication logs communication logs 151 to 153, the application log 154 and the communication logs 155 to 156 are displayed on the log analysis screen 120, in chronological order according to the stored time information, as the image of the sequence.

Here, by clicking the communication log 151, details of the communication log 151 can be perused. With regard to the communication processing time between the respective communication logs, for instance, by perusing the communication processing time 157 between the communication log 151 and the communication log 152, it is possible to know which processing took time among the series of transactions. Moreover, by clicking the application log 154, details of the application log output by the mobile terminal 20 can be perused. Furthermore, since the sequence after the communication log 153 has not reached the data center 40, it can be understood that the request sent from the in-vehicle terminal 10 to the mobile terminal 20 has not reached the AP server 41 of the data center 40 from the mobile terminal 20.

Note that, while the first embodiment and the second embodiment explained cases of a mode where the in-vehicle terminal 10 and the mobile terminal 20 are connected, the present invention can also be applied to cases, in the same manner as the foregoing explanation, even when the in-vehicle terminal 10 is directly connected to the internet network 70.

Figure 14:
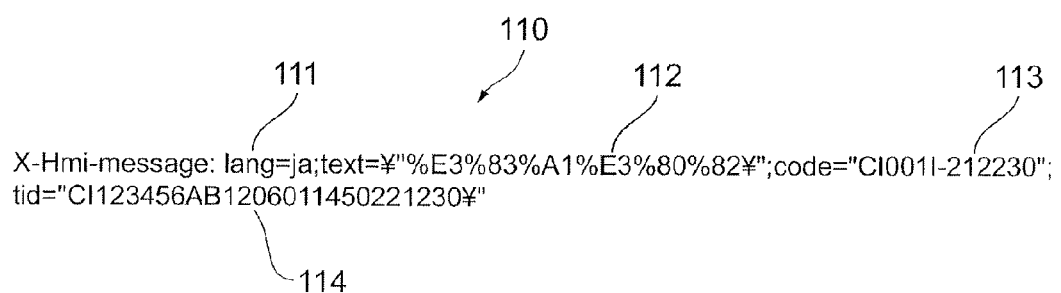
FIG. 14 is another configuration diagram of the HMI message.

FIG. 14 is another configuration diagram of the HMI message. In FIG. 14, the HMI message 110 upon using an HTTP (Hypertext Transfer Protocol) communication is configured from information for identifying the device in which a failure was detected. The HMI message 110 stores information related to an X-HMI-message defined as the additional header of HTTP. For example, the HMI message 110 stores a language 111, a message text 112, an HMI message code 113, and a transaction ID 114. Note that the information stored in the HMI message 110 may be increased or decreased as needed.

According to this embodiment, the system administrator can identify the failure location and the contents of the failure from the communication logs 131 to 134, the application log 135 and the communication logs 136 to 139, the communication processing time between the respective communication logs, and information such as the HMI message code 100. For example, it is possible to identify the communication failure between the in-vehicle terminal 10 and the mobile terminal 20, and the failure to the effect that the request sent from the in-vehicle terminal 10 has not reached the AP server 41.

Here, when the request of the mobile terminal 20 does not reach the data center 40 and the mobile terminal 20 detects this failure, the mobile terminal 20 may also generate an HMI message and an HMI message code, and send the generated HMI message and HMI message code to the in-vehicle terminal 10. The in-vehicle terminal 10 stores a communication log to the effect that the HMI message and the HMI message code have been received.

Moreover, according to this embodiment, since the in-vehicle terminal 10 and the mobile terminal 20 do not need to store the sTID having a large data volume as a log, and only need to store the cTID and the HMI message code 100 as the logs, the log buffers 16, 27 can be configured to be log buffers having a smaller data volume than the log buffer 45.

(Embodiment 3)

This embodiment describes a case of the AP server 41 of the data center 40 distributing push data to the in-vehicle terminal 10.

This embodiment describes a case where, when the AP server 41 of the data center 40 is to distribute data for distribution, such as push data, to the in-vehicle terminal 10, the AP server 41 of the data center 40 generates an sTID (third transaction identifier) as the transaction ID for identifying the push data distribution processing, and uses the generated sTID to manage the push data in the respective AP servers 41, and the remaining configuration is the same as the first embodiment. Here, the term "push data" means the data to be actively distributed by the AP server 41 of the data center 40.

FIG. 15 is a sequence diagram explaining the processing of the third embodiment. This processing shows an example that is performed in cases where when the AP server 41 of the data center 40 distributing push data to the in-vehicle terminal 10, the AP server 41 of the data center 40 detects a failure as an event.

In FIG. 15, the server application 42 of the AP server, such as the AP server 41-n, for generating the push data generates push data to be distributed to the in-vehicle terminal 10 (S110), generates an sTID (third transaction identifier) as a transaction ID for uniquely identifying the series of transactions which is also an identifier for identifying the processing of distributing the generated push data (S111), stores an application log including the sTID in the log buffer 45 (S112), sends the push data and the sTID, for instance, to the AP server 41-1 for distributing the push data to the mobile terminal 20 (S113), and stores a push data transmission log including the sTID as a communication log in the log buffer 45 (S114).

The AP server application 42 of the AP server 41-1 that received the push data and the sTID stores a communication log including the sTID in the log buffer 45 (S115). Subsequently, the AP server application 42 of the AP server 41-1 executes processing for distributing the received push data, and generates, for instance, upon detecting a failure as an event in the course of executing this processing (S116), an HMI message (second message) and an HMI message code (second message code) (S117), stores an application log including the generated HMI message and HMI message code and the sTID in the log buffer 45 (S118), sends the push data including the generated HMI message and HMI message code to the mobile terminal 20 (S119), and stores a communication log including the HMI message code and the sTID in the log buffer 45 (S120).

The mobile terminal application 26 of the mobile terminal 20 that received the push data including the HMI message and the HMI message code generates a cTID (fourth transaction identifier) as a transaction ID for uniquely identifying the series of transactions and which is also an identifier for uniquely identifying the push data distribution processing (S121), stores an application log to the effect that the cTID has been generated in the log buffer 27 (S122), thereafter adds the cTID to the push data including the received HMI message and HMI message code, sends the push data added with the cTID to the in-vehicle terminal 10 together with the HMI message and the HMI message code (S123), and stores a communication log including the HMI message code and the cTID in the log buffer 27 (S124).

The in-vehicle terminal application 17 of the in-vehicle terminal 10 that received the push data including the HMI message and the HMI message code and information including the cTID stores a communication log including the HMI message code and the cTID in the log buffer 16 (S125), thereafter displays, among the received information, the HMI message and the HMI message code on the screen of the display unit 12 (S126), and then ends the processing of this routine.

In this embodiment, the processing of isolating the failure in cases where the system administrator to isolate the failure receives an inquiry from the user of the in-vehicle terminal 10 is the same as the sequence (steps S50 to S56) of FIG. 8. Moreover, the log analysis processing and the processing of displaying the log analysis screen are also the same as the examples illustrated in FIG. 12 and FIG. 13.

Here, upon managing the in-vehicle log, the mobile log and the server log as the search targets, the log management server 50 extracts, among the search targets, the logs that are identified with the sTID (third transaction identifier) and the logs that are identified with the cTID (fourth transaction identifier) which are related to the HMI message (second message) on the condition that logs storing the HMI message (second message) exist in the search targets, creates a sequence of the logs according to the time information of the extracted logs, and displays an image of the created sequence on the log analysis screen.

According to this embodiment, if a failure occurs as an event when the AP server 41 in the data center 40 distributes push data to the in-vehicle terminal 10, the system administrator can identify the failure location and the contents of the failure from the information (communication logs, communication processing time between application logs and communication logs, and HMI message code) displayed on the log analysis screen.

Moreover, according to this embodiment, since the log buffer 16 of the in-vehicle terminal 10 and the log buffer 27 of the mobile terminal do not need to store the sTID generated by the AP server 41, the data volume of the log buffers 16, 27 can be made to be smaller than the data volume of the log buffer 45 of the AP server 41.

Note that the present invention is not limited to the embodiments described above, and also covers various modified examples. For example, the foregoing embodiments were described in detail for explaining the present invention in an easy-to-understand manner, and the present invention is not necessarily limited to the configurations comprising all of the components. Moreover, a part of the configuration of a certain embodiment may be replaced with the configuration of another embodiment, and the configuration of a certain embodiment may be added to the configuration of another embodiment. Moreover, a different configuration may be added to, deleted from or replaced with a part of the configuration of the respective embodiments.

Moreover, a part or all of the respective configurations and functions described above may be realized with hardware such as by designing integrated circuits. Moreover, the respective configurations and functions described above may also be realized with software by a processor interpreting and executing the programs that realize the respective functions. Information such as programs, tables and files for realizing the respective functions may be recorded and stored in a storage device such as a memory, a hard disk, or an SSD (Solid State Drive), or in a recording medium such as an IC (Integrated Circuit) card, an SD (Secure Digital) memory card, or a DVD (Digital Versatile Disc).

REFERENCE SIGNS LIST

10 in-vehicle terminal, 11 input unit, 12 display unit, 13 in-vehicle terminal control unit, 14 memory card interface, 15 connection interface, 16 log buffer, 17 in-vehicle terminal application, 20 mobile terminal, 21 input unit, 22 display unit, 23 mobile terminal control unit, 24 external communication interface, 25 connection interface, 26 mobile terminal application, 27 log buffer, 40 data center, 41 application server, 50 log management server, 60 inter-terminal network, 70 internet network, 71 external service

The invention claimed is:

1. An in-vehicle information system in which an in-vehicle terminal and a mobile terminal and one or more servers are communicably coupled to each other,
wherein the in-vehicle terminal:
generates, upon sending a request to the server, a first transaction identifier for identifying a series of transactions prescribed in the request, and sends the request including the first transaction identifier to the mobile terminal on a condition that an in-vehicle log including the generated first transaction identifier is stored in an in-vehicle log buffer; and
outputs, upon receiving a response transferred from the mobile terminal, information to be displayed among information added to the received response on a condition that an in-vehicle log to be stored among information added to the received response is stored in the in-vehicle log buffer,
wherein the mobile terminal:
sends, upon receiving the request from the in-vehicle terminal, the request to the server on a condition that a mobile log including the first transaction identifier added to the received request is stored in a mobile log buffer; and
transfers, upon receiving a response from the server, the received response to the in-vehicle terminal on a condition that a mobile log including information to be stored among information added to the received response is stored in the mobile log buffer, and
wherein any one of the servers among the plurality of servers:
stores, upon receiving the request from the mobile terminal, a server log including the first transaction identifier in a server log buffer on a condition that the first transaction identifier has been added to the received request, generates a second transaction identifier for identifying a series of transactions prescribed in the received request on a condition that the first transaction identifier has been added to the received request, generates a first message for displaying contents of a first event and a first message code, in which information related to the second transaction identifier is coded, on a condition that an occurrence of the first event is detected in a course of executing processing according to the received request, and stores a server log including the generated second transaction identifier, the generated first message and the first message code in the server log buffer; and
transfers, upon sending a response to the mobile terminal, a response including the first transaction identifier, the first message and the first message code, to the mobile terminal on a condition that a server log including the first transaction identifier exists in the server log buffer, and transfers, to the mobile terminal, a response including the first message and the first message code on a condition that a server log including the first transaction identifier does not exist in the server log buffer.

2. The in-vehicle information system according to claim 1,
wherein any one of the servers among the plurality of servers:
generates, upon distributing data for distribution to the in-vehicle terminal, a third transaction identifier for identifying processing of the distribution, stores a server log including the generated third transaction identifier in the server log buffer, and, on a condition that an occurrence of the second event is detected in a course of executing processing of the distribution, generates a second message for displaying contents of a second event and a second message code, in which information related to the third transaction identifier is coded, stores a server log including the generated third transaction identifier, the generated second message and the second message code in the server log buffer, and transfers, to the mobile terminal, information including the generated second message and second message code and the data for distribution, wherein the mobile terminal:

generates, upon receiving information including the second message, the second message code and the data for distribution from the server, a fourth transaction identifier for identifying processing of the distribution, stores, in the mobile log buffer, a mobile log including the generated fourth transaction identifier and the second message and the second message code received from the server, and sends the received information to the in-vehicle terminal, and wherein the in-vehicle terminal:

stores, upon receiving information including the second message, the second message code, the data for distribution and the fourth transaction identifier from the mobile terminal, an in-vehicle log including the second message, the second message code and the fourth transaction identifier among the received information, in the in-vehicle log buffer, and outputs the second message and the second message code among the received information.

3. The in-vehicle information system according to claim 1, wherein the in-vehicle information system comprises a log management server which manages logs existing in search targets with the in-vehicle log, the mobile log and the server log as the search targets, wherein the log management server:

extracts, when logs storing the first message code exist in the search targets, the logs identified with the first transaction identifier among the search targets, creates a sequence of the extracted logs according to time information of the extracted logs, and displays an image of the created sequence on a log analysis screen.

4. The in-vehicle information system according to claim 1, wherein the in-vehicle information system comprises a log management server which manages logs existing in search targets with the in-vehicle log, the mobile log and the server log as the search targets, wherein the log management server:

extracts, when logs storing the first message code exist in the search targets, from the search targets, the logs identified with the first transaction identifier and logs identified with the second transaction identifier associated with the first message code, creates a sequence of the extracted logs according to time information of the extracted logs, and displays an image of the created sequence on a log analysis screen.

5. The in-vehicle information system according to claim 2, wherein the in-vehicle information system comprises a log management server which manages logs existing in search targets with the in-vehicle log, the mobile log and the server log as the search targets, wherein the log management server:

extracts, when logs storing the second message code exist in the search targets, the logs identified with the third transaction identifier associated with the second message code and logs identified with the fourth transaction identifier, from the search targets, creates a sequence of the extracted logs according to time information of the extracted logs, and displays an image of the created sequence on a log analysis screen.

* * * * *